United States Patent [19]
Rudolph

[11] Patent Number: 5,346,189
[45] Date of Patent: Sep. 13, 1994

[54] HYDRAULICALLY DAMPED RUBBER BEARING

[75] Inventor: Axel Rudolph, Bensheim, Fed. Rep. of Germany

[73] Assignee: Firma Carl Freudenberg, Weinheim, Fed. Rep. of Germany

[21] Appl. No.: 157,594

[22] Filed: Nov. 24, 1993

Related U.S. Application Data

[62] Division of Ser. No. 916,563, Jul. 20, 1992.

[30] Foreign Application Priority Data

Aug. 13, 1991 [DE] Fed. Rep. of Germany ....... 4126673

[51] Int. Cl.$^5$ ............................................. F16F 9/10
[52] U.S. Cl. ................................ 267/219; 267/140.13
[58] Field of Search ................ 267/35, 140.11, 140.13, 267/219, 220; 248/562, 636; 180/902, 312, 300

[56] References Cited

U.S. PATENT DOCUMENTS

| | | | |
|---|---|---|---|
| 4,469,316 | 9/1984 | van den Boom et al. | 267/140.13 |
| 4,741,520 | 5/1988 | Bellamy et al. | 267/140.13 |
| 4,830,346 | 5/1989 | Eberhard et al. | 267/219 |
| 4,877,225 | 10/1989 | Noguchi et al. | 267/35 |
| 4,887,801 | 12/1989 | Wolf et al. | 267/140.13 |
| 5,102,105 | 4/1992 | Hamaekers et al. | 267/140.13 |

FOREIGN PATENT DOCUMENTS

| | | | |
|---|---|---|---|
| 0298863 | 1/1989 | European Pat. Off. | 267/219 |
| 0474334 | 3/1989 | Japan | 267/140.13 |
| 2237355 | 5/1991 | United Kingdom | 267/140.13 |

Primary Examiner—Robert J. Oberleitner
Assistant Examiner—Lee W. Young
Attorney, Agent, or Firm—Sprung Horn Kramer & Woods

[57] ABSTRACT

In a hydraulically damped rubber bearing, a supported component is attached to a supporting component by an element made of resilient material. The supported and supporting components enclose an activating chamber occupied by a fluid. The activating chamber is separated from a compensation chamber by a partition. The partition accommodates at least one port. At least some of the partition is flexible. The compensation chamber is sealed off from outside by a diaphragm secured to the supporting component. The flexible section of the wall and the diaphragm are molded in one piece. The molding is fastened to the partition essentially fluid-tight in the zone between the flexible section and the diaphragm.

6 Claims, 6 Drawing Sheets

HYDRAULICALLY DAMPED RUBBER BEARING

CROSS REFERENCE TO RELATED APPLICATION

This application is a divisional application corresponding to U.S. patent application Ser. No. 07/916,563, filed Jul. 20, 1992, now pending.

BACKGROUND OF THE INVENTION

The present invention concerns a hydraulically damped rubber bearing. A supported component is attached to a supporting component by an element made of a resilient material. The supported and supporting components enclose an activating chamber occupied by a fluid. The activating chamber is separated from a compensation chamber by a partition. The partition accommodates at least one port. At least some of the partition is flexible. The compensation chamber is sealed off from outside by a diaphragm secured to the supporting component.

A rubber bearing of this type is illustrated in FIGS. 13 and 14 of German Patent No. 2,727,244. The motion of at least some of the partition is axially limited by stops. Large amplitude vibrations are suppressed by a fluid flowing through openings. Smaller amplitude vibrations are isolated by the partition's axial motion, with no interchange of fluid through the calibrating openings between the two chambers. This embodiment comprises a large number of specifically associated individual parts. Although each individual part is in itself comparatively easy to manufacture, their multiplicity renders the rubber bearing complicated and difficult to assemble, so that it is not very satisfactory from the aspect of cost.

SUMMARY OF THE INVENTION

The principal object of the invention is to provide a hydraulically damped rubber bearing that has been improved in that it is assembled from fewer components and is accordingly simpler to manufacture and assemble and hence more economical, while exhibiting satisfactory and long-term reliability.

This object, as well as other objects apparent from the following discussion, are attained in accordance with the invention in that the flexible section of the wall and the diaphragm are molded in one piece and in that the molding is fastened to the partition essentially fluid-tight in the zone between the flexible section and the diaphragm. The advantage of this arrangement is that the bearing is simpler and comprises fewer components and is accordingly easier and more cost-effective to manufacture. The essentially fluid-tight fastening between the molding and the partition can, for example, be a snap-together ring that forces the two components together and seals them. It is also possible for the ring to be cemented or vulcanized to the molding, which can be forced in the assembled bearing against a metal partition, for example.

The rubber bearing according to the present invention operates in the following manner:

The bearing is designed when operating properly to disengage higher-frequency from lower-frequency vibrations. Higher-frequency vibrations are isolated by the axial motion of the flexible section of the partition. No fluid is exchanged between the activating chamber and the compensation chamber. Lower-frequency vibrations are suppressed when the fluid in the activating chamber, which communicates with the compensation chamber through the at least one port, resonates with the fluid in the compensation chamber. Wide-amplitude vibrations generated by the roadway, for example, are accordingly effectively suppressed. Depending on the particular situation, the ports can be in the partition between the activating chamber and the compensation chamber or a port can consist of a constriction of with a specific length and cross-section.

The molding in one advantageous embodiment has an undercut elevation and snaps into a perforation through a rigid section of the partition. The elevation can fit loosely in the perforation with play. The advantage is that the molding can be very simply secured to the partition without fasteners.

To ensure a fluid-tight seal between the molding and the rigid section of the partition, the undercut in the molding can be cemented to the perforation in the partition. To ensure particularly silent operation on the part of the rubber bearing, the areas of the rigid section of the partition and molding that come into contact with each other can be structured. To further improve the isolation of higher-frequency vibrations (stimulated, for example, by imbalances in the internal-combustion engine) the elevation can fit loosely in the perforation with play. The play can advantageously occur axially on each side of the partition that the rigid section of the undercut in the molding fits into. The result will be effective isolation of higher-frequency vibrations during both tension and compression on the rubber bearing. Since the play will preferably be more or less on the order of a few tenths of a millimeter, the seam between the molding and the rigid section of the partition will still be tight.

The elevation can have a valve tongue integrated into it, essentially sealing off one side of a secondary perforation in the rigid section of the partition. The valve tongue can be positioned to act when the bearing is subject to both tension and compression. This is particularly practical when the bearing's tension and compression stages must be differently designed. When the tongue faces the activating chamber, for example, there will be a more rapid interchange of fluid between the activating chamber and the compensation chamber when the bearing is subjected to load.

In the event of subsequent compression, there will be an exchange of volume through the ports between the activating chamber and the compensation chamber, improving the vibration suppression.

The valve tongue in another embodiment can snap into the secondary perforation. In addition to satisfactory decompression, this approach ensures an effective relationship between the components and simple assembly.

The valve tongue can also have a tertiary perforation in the vicinity of the secondary perforation with a cross-section narrower than that of the secondary perforation. This design also results in suppression characteristics that differ in response to tension and compression on the rubber bearing.

The secondary perforation in one particularly simple embodiment can be a slit or incision, with no material removed. This approach also makes the rubber bearing adaptable to various applications. A very extensive range of suppression can be attained due strictly to the design of the one-piece molding and of the tertiary perforation in it. Replacing the molding without otherwise modifying the bearing will result in a wide range of applications. The design of the perforations and position of the valve tongue can also be varied to extend the range of suppression and isolation.

The preferred embodiments of the invention will now be described with reference to the accompanying drawings.

DESCRIPTION OF THE PREFERRED EMBODIMENTS

Figure 1:
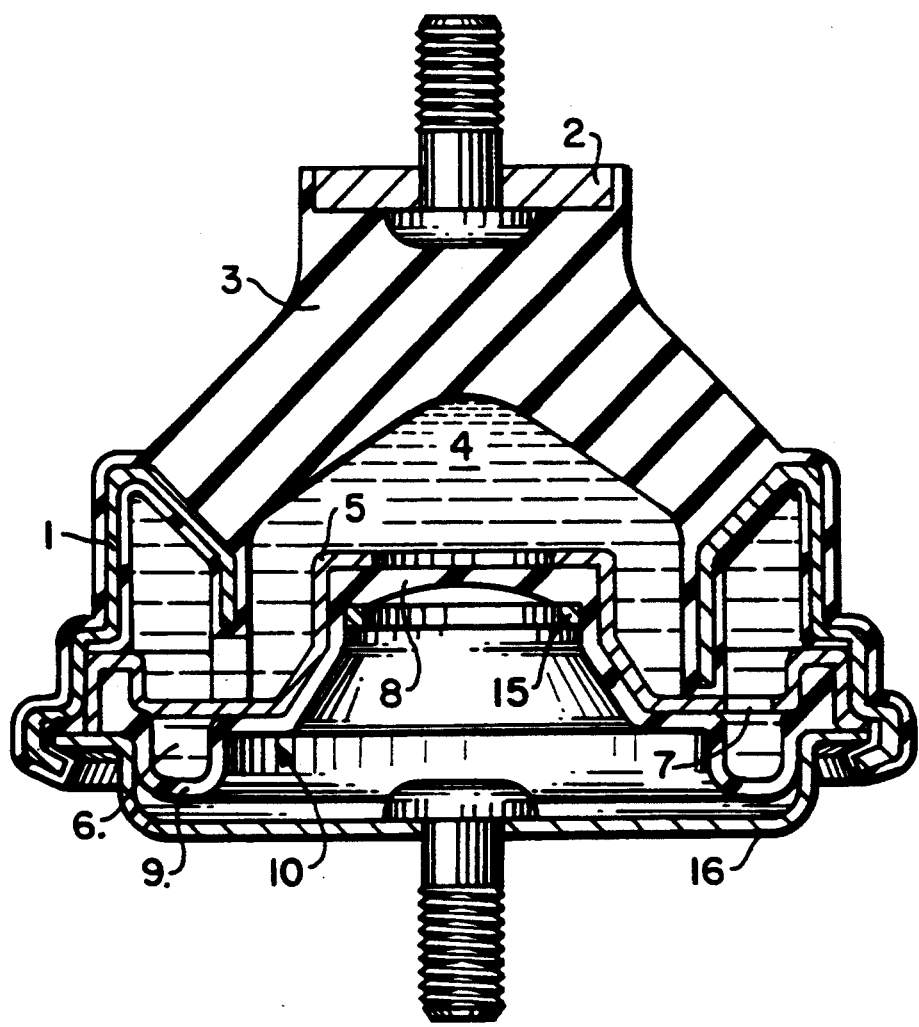
FIG. 1 is a cross-sectional view of a hydraulically damped rubber bearing in accordance with a first preferred embodiment of the present invention.

As shown in FIG. 1, the rubber bearing according to the invention has a supporting component 1 with a supported component 2 resting on it. They are attached together by a hollow conical element 3 of resilient material. As will be understood by those skilled in the art, it is possible to apply the teaching of the present invention to other embodiments.

In these examples, a fluid-filled activating chamber 4 is separated from a compensation chamber 6 by a partition 5, 8 mounted on the supporting component 1. The partition between the activating chamber 4 and compensation chamber 6 accommodates a port 7, through which the two chambers communicate. The supporting component 1 is designed to create a constricting channel that suppresses lower-frequency vibrations. The length and cross-section of the channel depends upon the particular application. The partition 5, 8 has a rigid section 5 and a flexible section 8. The flexible section 8 disengages higher-frequency vibrations from lower-frequency vibrations. Compensation chamber 6 is sealed off from outside by a diaphragm 9 secured to the supporting component 1. The flexible section 8 and diaphragm 9 are in one piece and constitute a molding 10. The molding 10 can, for example, accommodate an armature, which will extend its life even more by decreasing the risk of damage. The molding 10 rests essentially fluid-tight against the rigid section of the partition, preventing a direct interchange of fluid between the activating chamber 4 and the compensation chamber 6.

Figure 5:
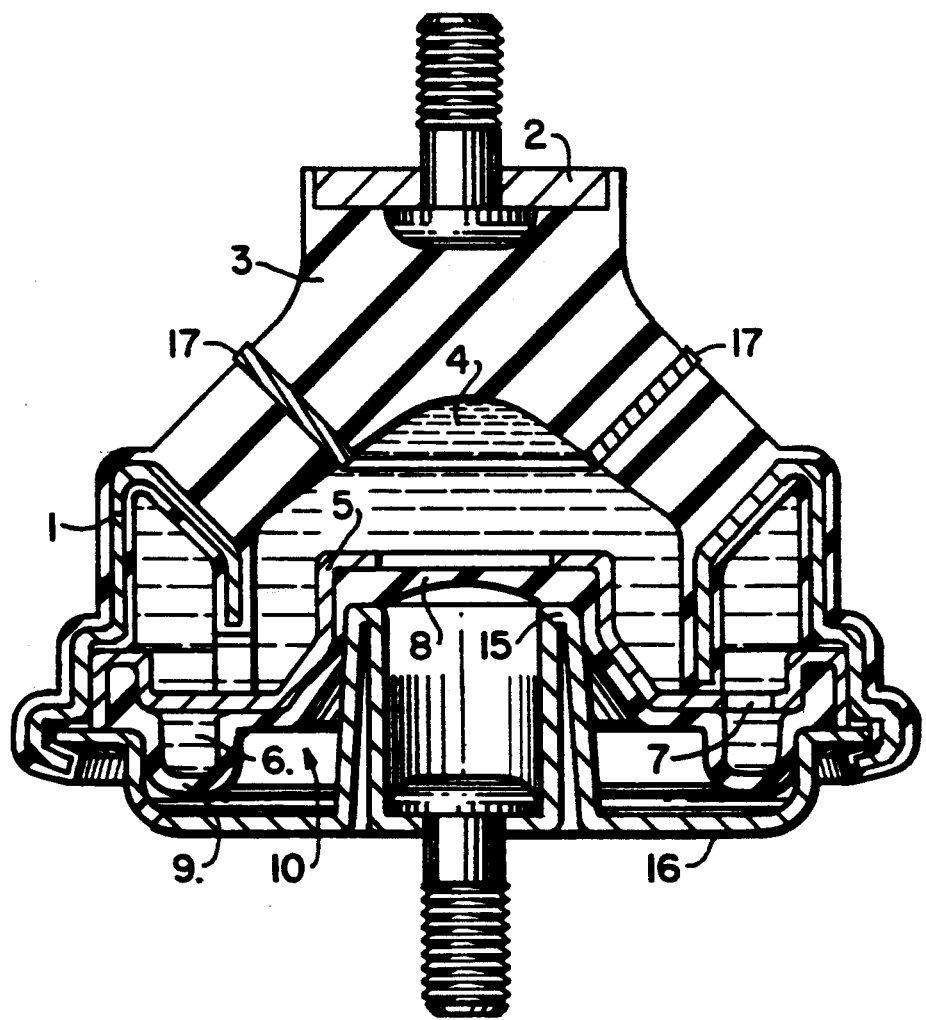
FIG. 5 is a cross-sectional view of a hydraulically damped rubber bearing in accordance with a fifth preferred embodiment of the present invention.

The rubber bearing in FIG. 1 has a snap-together ring 15 that forces the molding 10, comprising the diaphragm 9 and flexible section 8, against the rigid section of the partition, creating a seal. The ring 15 can be replaced by a concavity in a base 16 as illustrated in FIG. 5. In another (unillustrated) embodiment an additional mass is provided inside the flexible section 8 to affect the section's axial motion. Additional hydraulic effects, decreased dynamic resilience for example, can be attained by varying the shape of the flexible section 8. For example, the flexible section 8 can demarcate, toward the activating chamber 4, a flowerpot-shaped compartment in one piece with molding the 10 that fills up with fluid when the rubber bearing is in operation. The flowerpot-shaped compartment is sealed off, fluid-tight from its environment and no fluid can be exchanged between the activating chamber 4 and the compensation chamber 6.

Fluid flows out of activating chamber 4 and into compensation chamber 6 only through a constricted channel created by the supporting component 1 and the port 7. Suppression and isolation are identical, no matter whether the bearing is being subjected to tension or compression.

Figure 2:
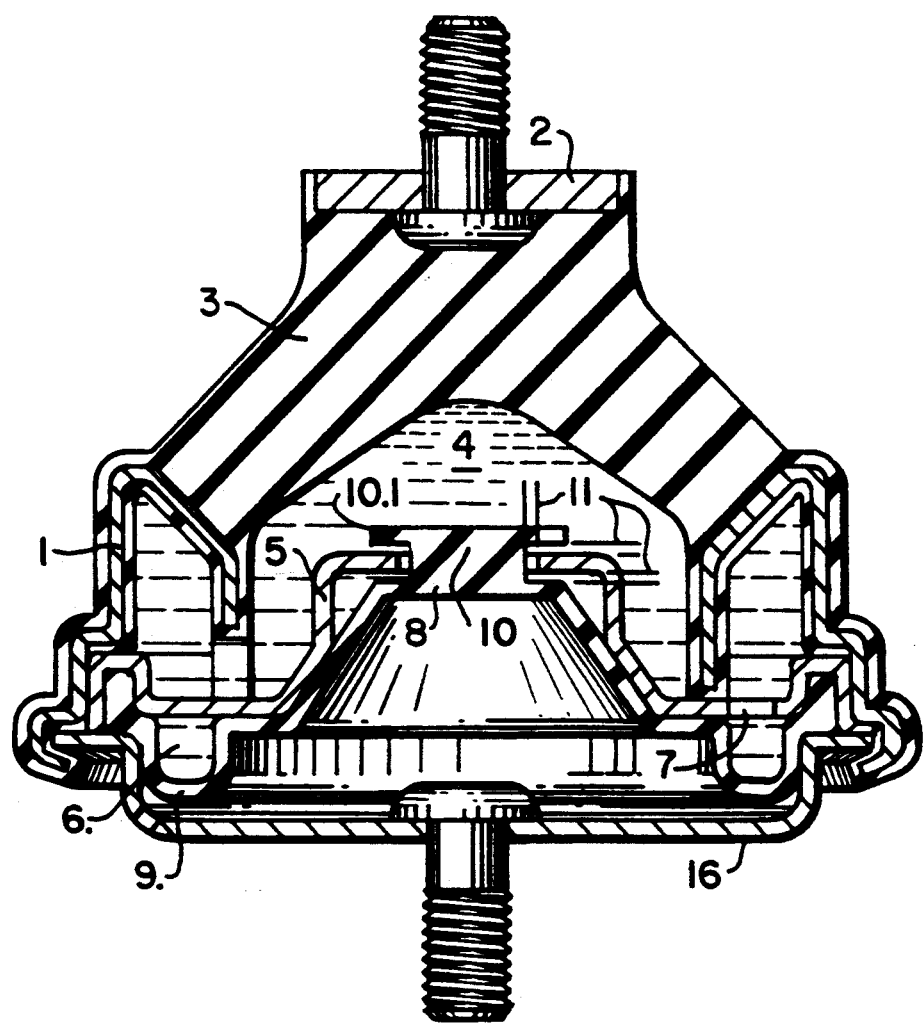
FIG. 2 is a cross-sectional view of a hydraulically damped rubber bearing in accordance with a second preferred embodiment of the present invention.

The rubber bearing illustrated in FIG. 2 differs essentially from the bearing illustrated in FIG. 1 only in how the molding 10 is secured to the rigid section 5 of the partition. The molding 10 illustrated in FIG. 2 has an elevation 10.1 and undercut in the vicinity of the perforation through the rigid section 5 of the partition. The undercut fits into the perforation. No extra fastener is needed to secure the molding 10 to the rigid section 5 of the partition, which further simplifies assembling the bearing. The elevation 10.1 also fits into the perforation in the rigid section 5 of the partition with a certain amount of play 11. The result is improved isolation of higher-frequency vibrations. The play 11 is only a few tenths of a millimeter, so that the direct exchange of fluid between the activation chamber 4 and the compensation chamber 6 is negligibly small. To ensure absolute tightness between the molding 10 and the rigid section 5 of the partition, it is possible to fasten the two components together in an area that contributes little to isolating or suppressing vibrations, with a snap-together ring or with cement, for example.

Figure 3:
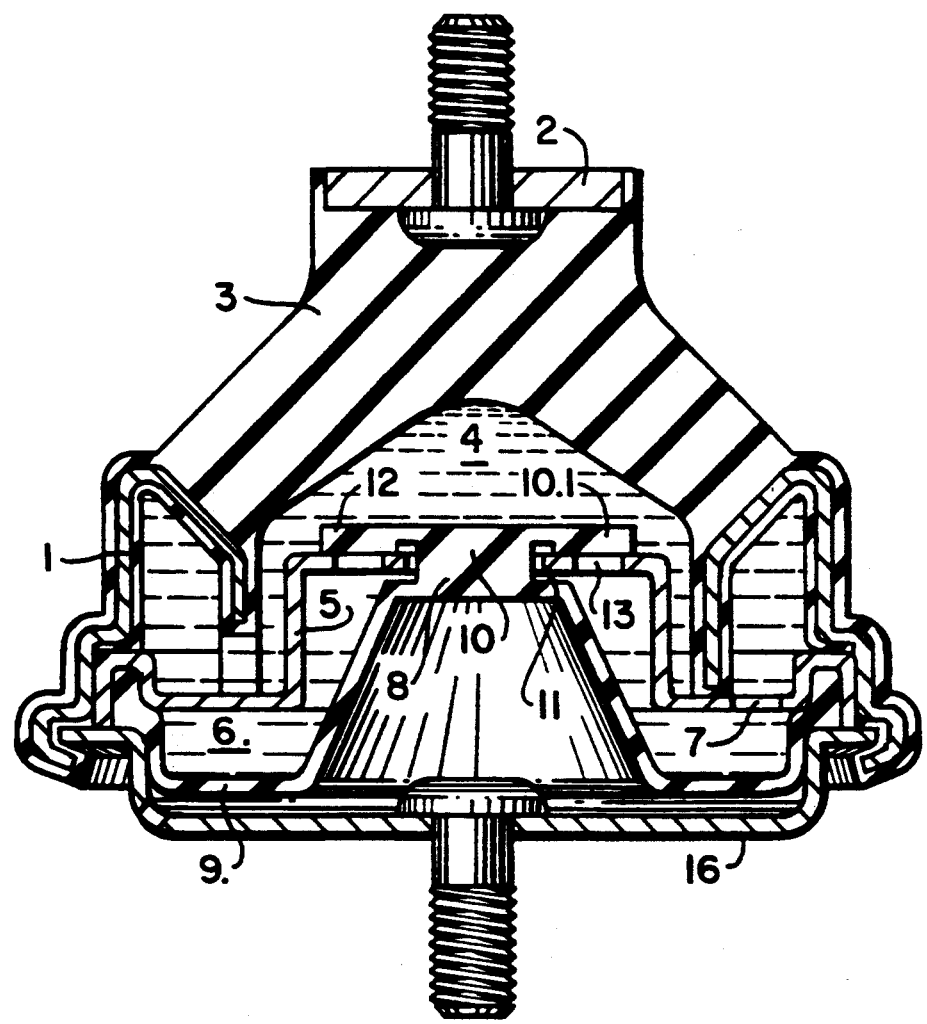
FIG. 3 is a cross-sectional view of a hydraulically damped rubber bearing in accordance with a third preferred embodiment of the present invention.

The rubber bearing illustrated in FIG. 3 is essentially identical with those illustrated in FIGS. 1 and 2, except that the activating chamber 4 communicates with the compensation chamber 6 through a port 7 and through two (for example) secondary perforations 13 in the rigid section 5 of the partition. The valve tongues 12 are integrated into the elevation 10.1 on the molding 10 and seal off the secondary perforations 13 in the rigid section 5 of the partition. The advantage of this embodiment is that the tensioned bearing exhibits suppression and isolation that differ from those occurring during compression. When the bearing is compressed, the fluid suppresses lower-frequency vibrations by leaving the activating chamber 4 and entering the compensation chamber 6 through the constricted channel constituted by the supporting component 1 and the port 7. When the bearing is subsequently tensioned, the fluid travels essentially more directly, some of it through secondary perforations 13 and some of it through the port 7 from the compensation chamber 6 to the activating chamber 4. This action results in a rapid yielding on the part of the bearing in response to tension and in greater rigidity in response to compression.

Figure 4:
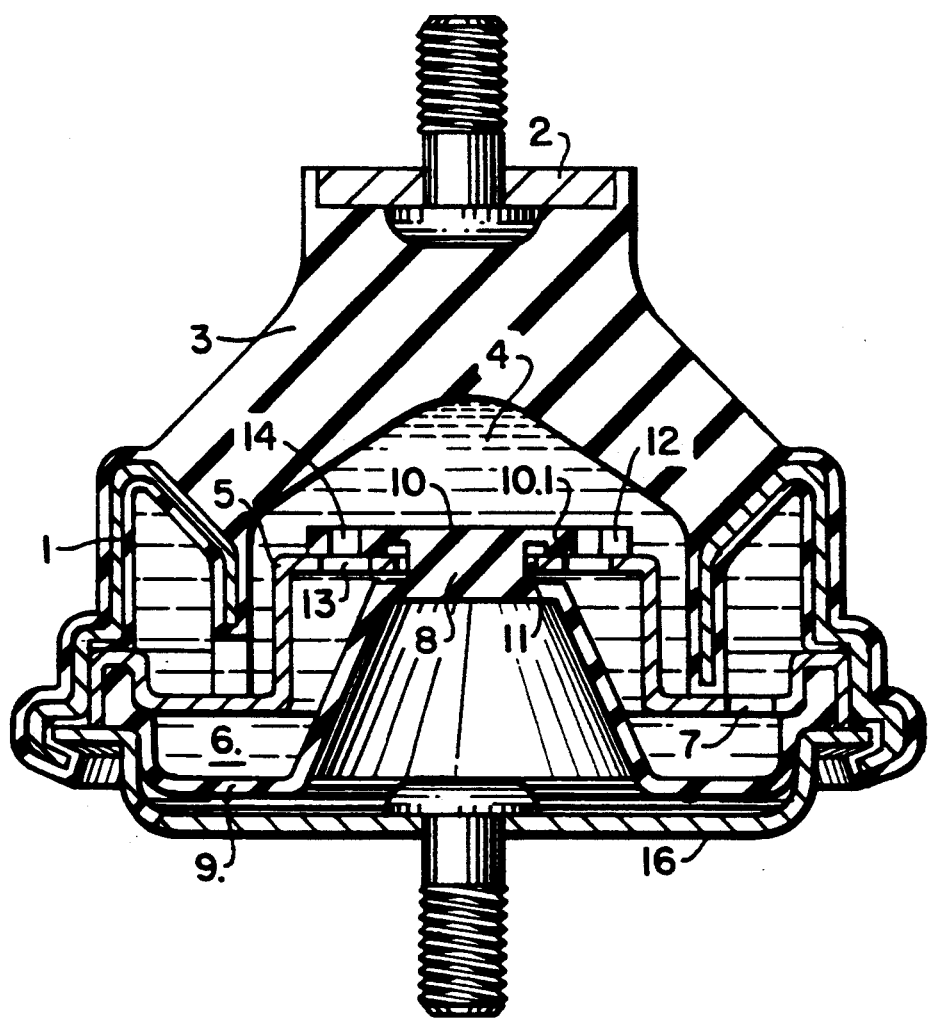
FIG. 4 is a cross-sectional view of a hydraulically damped rubber bearing in accordance with a fourth preferred embodiment of the present invention.

The rubber bearing illustrated in FIG. 4 differs from the one illustrated in FIG. 3 by tertiary perforations 14 in the valve tongue 12 in the vicinity of the secondary perforations 13 in the rigid section 5 of the partition. The tertiary perforations 14 have a smaller cross-section than the secondary perforations 13. Various characteristics can be attained by varying the cross-sections of the secondary perforations 13 and of the tertiary perforations 14, respectively.

This rubber bearing operates essentially the same as the one illustrated in FIG. 3, although compression is less strongly resisted. This bearing is distinguished, like the one illustrated in FIG. 3, by an extensive range of suppression accompanied by outstanding suppression and isolation properties.

The rubber bearings illustrated in FIGS. 2 through 4 can have impact cushions in the vicinity of their undercuts to prevent hard impacts between the rigid section 5 of the partition and the molding 10. These embodiments operate at a very low level of noise.

FIG. 5 illustrates a bearing in accordance with the invention wherein a concavity in the base 16 replaces the ring 15. The resilient element 3 is divided by an intermediate metal ring 17 into resilient-element halves 3.1 and 3.2. The advantage is that the two halves can be made of different material, each with a specific resilience, which can be practical in some applications.

Figure 6:
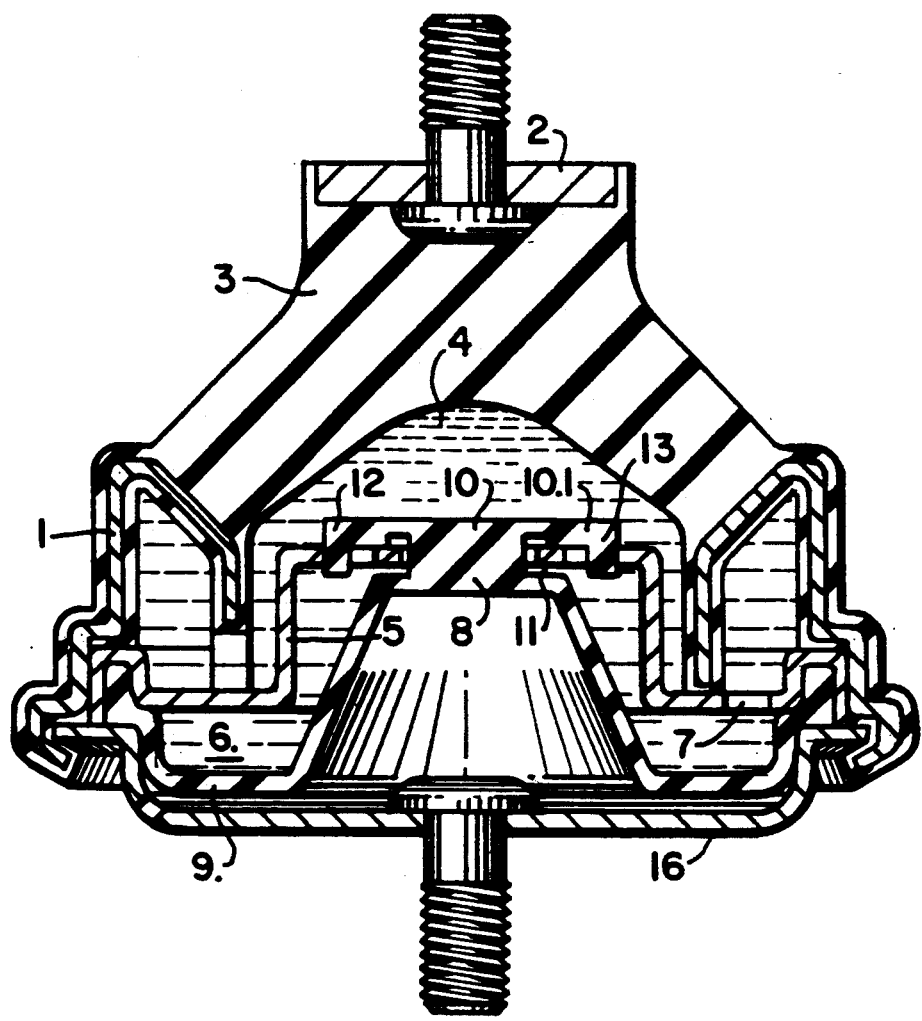
FIG. 6 is a cross-sectional view of a hydraulically damped rubber bearing in accordance with a sixth preferred embodiment of the present invention.

The rubber bearing illustrated in FIG. 6 is similar to that illustrated in FIG. 3, with the valve tongue 12 snapping into secondary the perforations 13.

There has thus been shown and described a novel hydraulically damped rubber bearing that fulfills all the objects and advantages sought therefor. Many changes, modifications, variations, and other uses and applications of the subject invention will, however, become apparent to those skilled in the art after considering this specification and the accompanying drawings, which disclose the preferred embodiments thereof. All such changes, modifications, variations, and other uses and applications that do not depart from the spirit and scope of the invention are deemed to be covered by the invention, which is to be limited only by the claims that follow.

What is claimed is:

1. In a hydraulically damped rubber bearing with a supported component attached to a supporting component by an element made of a resilient material, wherein the supported and supporting components enclose an activating chamber occupied by a fluid, the activating chamber is separated from a compensation chamber by a partition, the partition accommodates at least one port, a section of the partition is flexible, and the compensation chamber is sealed off from outside by a diaphragm secured to the supporting component, the improvement wherein both the flexible section of the partition and the diaphragm are formed by a single one piece molding; and wherein the molding has an undercut elevation and snaps into a perforation through a substantially rigid section of the partition.

2. Rubber bearing as defined in claim 1, wherein the elevation fits loosely in the perforation with play.

3. Rubber bearing as defined in claim 1, wherein the elevation has a valve tongue integrated into it and essentially sealing off one side of a secondary perforation in the substantially rigid section of the partition.

4. Rubber bearing as defined in claim 3, wherein the valve tongue snaps into the secondary perforation.

5. Rubber bearing as defined in claim 3, wherein the valve tongue has a tertiary perforation in the vicinity of the secondary perforation with a cross-section narrower than that of the secondary perforation.

6. Rubber bearing as defined in claim 3, wherein the secondary perforation is a slit or incision, with no material removed.

* * * * *